United States Patent [19]

Graham

[11] Patent Number: 5,765,803
[45] Date of Patent: Jun. 16, 1998

[54] VEHICLE SEAT SUSPENSION SYSTEM

[76] Inventor: David S. Graham, 206 Sherwin Dr., Urbana, Ill. 61801

[21] Appl. No.: 573,177

[22] Filed: Dec. 15, 1995

[51] Int. Cl.$^6$ .................................................. F16M 13/00
[52] U.S. Cl. .......................... 248/624; 248/636; 267/221; 296/65.1
[58] Field of Search ............................ 267/34, 221, 223, 267/224, 225; 297/259.4, 344.1, 344.12, 344.19, 344.24, 311; 248/394, 395, 396, 624, 550, 562, 636, 638; 296/65.1

[56] References Cited

U.S. PATENT DOCUMENTS

| | | | |
|---|---|---|---|
| 1,271,869 | 4/1918 | Lacey | 248/394 |
| 2,519,963 | 8/1950 | Heffernan | 297/344.12 |
| 3,366,400 | 1/1968 | Fitch | 267/221 |
| 3,469,859 | 9/1969 | Giacosa | 267/34 |
| 3,599,955 | 8/1971 | Yew | 267/34 |
| 3,736,020 | 5/1973 | Pilachowski | 296/63 |
| 3,881,713 | 5/1975 | Joyce | 267/131 |
| 3,927,854 | 12/1975 | Carey | 248/621 |
| 4,105,195 | 8/1978 | Lamberts | 267/131 |
| 4,183,492 | 1/1980 | Meiller | 248/395 |
| 4,465,300 | 8/1984 | Raidel | 267/225 |
| 4,626,018 | 12/1986 | Massey | 296/65 |
| 4,662,597 | 5/1987 | Uecker | 248/564 |
| 4,729,538 | 3/1988 | Bergacker | 248/421 |
| 5,004,206 | 4/1991 | Anderson | 267/225 |
| 5,222,709 | 6/1993 | Culley, Jr. | 248/421 |
| 5,273,260 | 12/1993 | Nagata | 267/131 |

*Primary Examiner*—Leslie A. Braun
*Assistant Examiner*—Gwendolyn W. Baxter

[57] ABSTRACT

A suspension system for a seat for a vehicle having a base frame rigidly attached to the vehicle. The front of a seat support frame is pivotally moveable with respect to the base frame. Springs mounted between the seat support frame and the base frame cushion the seat from forces imparted while driving the vehicle on irregular surfaces. The springs further limit the pivotal movement of the seat support frame with respect to the base frame. There are shock absorbers for dissipating energy absorbed by the springs. The pivotal movement of the seat is around two different axes of rotation, one of the axes being a horizontal axis extending across the width of the vehicle and the other axis being a longitudinal axis extending from the front to the rear of the vehicle.

15 Claims, 4 Drawing Sheets

VEHICLE SEAT SUSPENSION SYSTEM

FIELD OF THE INVENTION

The present invention relates to a vehicle seat suspension system and, more particularly, to a seat suspension system useful particularly for four-wheel drive vehicles, trucks, tractors, and other off-the-road vehicles as well as for vehicles used on irregular road surfaces.

BACKGROUND OF THE INVENTION

Seats in vehicles are designed to provide comfort for riders and passengers when the vehicles are in use. Comfort for the driver also contributes to safety by assisting the driver in avoiding tiredness over long periods, maintaining alertness, minimizing muscle stiffness and avoiding the need for shifting of the driver's body to relieve discomfort, which could result in lessened control over the vehicle.

Most seat systems provide for movement of the entire seat forward and backward to different positions for drivers of different body sizes to have convenient access to foot and hand controls and also provide for upward and downward movement of the entire seat to different heights so that drivers of different heights will have proper fields of vision. More sophisticated systems also provide for tilting of the seat to different fixable positions around one or even two parallel axes which extend across the width of the vehicle. This can relieve adverse effects of lack of blood circulation to the driver's legs over extended periods of driving. In some vehicles the lower portion of the back of the seat includes an inflatable and deflatable container which provides a desired amount of lower back support and further minimizes discomfort and fatigue. The angle of the seat back relative to the bottom cushion may also be adjustable. Recently computer systems have been introduced which will remember all the desired adjustments for each regular driver of a vehicle and make them automatically.

Vehicle seats are mounted to the chassis of the vehicle usually through a slide mechanism on the floor which permits the aforementioned movement of the seat forward and backward and locking of the seat in the desired position relative to the chassis. It is an important safety consideration that under no circumstance can the seat move forward or backward after it is locked in the desired position. Failure in this regard could cause the operator to increase or decrease his pressure on either the brake or accelerator pedal and thereby lose control of the vehicle. The movement of the chassis and hence of the seat relative to the terrain over which the vehicle moves is dampened by vehicle chassis suspension systems.

The vehicle chassis suspension system in many cases is not adequate by itself to provide the desired level of comfort for the driver and riders. It is most likely to do so in automobiles and other vehicles designed primarily for use on relatively smooth surfaces such as newly paved roads. Even for such uses an additional seat suspension system may be useful. For passenger automobiles which are mostly used on paved roads, seat suspension systems need only provide for a relatively small range in unevenness or imperfections in the road surface. Thus, the seat suspension device does not need to be very sophisticated or designed for large dips, holes, or other large gradients which may impart high shock forces to the driver. However, off-the-road vehicles commonly known as four-wheel drive vehicles, trucks, earth moving equipment, and tractors are not restricted to operation on smooth roads and highways. Rather, they are operated quite often at relatively high speeds on unknown and uneven surfaces. Rocks, holes, and other obstacles impart large forces to the vehicle suspension system and, in turn, to the driver of the vehicle.

Another related problem with most vehicles of this type is that the seat is often high above the ground and high above the means of entry to the vehicle. The occupants must climb into the vehicle and then sit down on the seat. In passenger cars by contrast, the seat is often located at or below knee level from the ground and the occupant can simply sit down on the seat and pivot his legs into the vehicle.

The prior art has taught several seat suspension systems to reduce the shocks and vibration transmitted from the vehicle to the operator through the seat.

One such device is illustrated in U.S. Pat. No. 5,222,709 entitled Vehicle Seat Suspension Unit issued to Culley, Jr., et al. In this patent, the inventor illustrates a seat suspension unit which provides for a suspension unit using a scissor arm assembly and springs to lessen the shock to the driver. However, it does not utilize damping or shock absorbing units per se. Instead, it uses rollers on the scissor arm assembly with the rollers moving along cam tracks to apply a restoring force to the vehicle seat frame.

Another patent which uses a scissors frame or x-shaped link is U.S. Pat. No. 5,273,260 entitled Seat Suspension Device for Automotive Seat issued to Nagata. This device uses a singular spring and damper assembly between an upward projection and a downward projection from frame members but does not permit pivotal rotation of the seat from side to side around an axis extending from the front to the rear of the vehicle.

U.S. Pat. No. 3,881,713 entitled Rocker Spring Unit was issued to Joyce. This unit discloses a series of rocker springs to permit the seat to pivot around a horizontal axis such that the front and rear of the seat can rotate up and down like a seesaw. However, it does not provide for rotation around an axis extending from the front to the rear of the vehicle.

Another device designed for snowmobiles is illustrated in U.S. Pat. No. 3,736,020 entitled Energy Absorbing Seat for Snowmobiles issued to Pilachowski, et al. This device uses a pair of shock absorbers surrounded by coil springs at the rear end of the seat. They extend downwardly and rearwardly from the seat so that a large amount of energy can be absorbed in a minimum distance of vertical travel of the seat. There are a pair of hinges at the front of the seat to connect the seat to the vehicle chassis. This permits limited pivotal movement of the seat about an axis extending across the width of the vehicle, but there is no permitted rotation about an axis extending along the length of the vehicle.

A problem with all of the devices illustrated in the prior art is that they only permit movement of the seat vertically and to a limited extent they permit pivotal movement of the seat about one axis. There is not any teaching of allowing pivotal movement of the seat about an axis extending from the front to the rear of the vehicle. Pivotal movement about two axes not only allows for greater comfort and control by the user, but allows tilting the seat about the long axis of the vehicle toward the direction of entry, enabling easier entry onto the seat by the user.

SUMMARY OF THE INVENTION

It is an object of this invention to provide a seat suspension system for a vehicle seat which provides for pivoting of a seat about two axes, both of which axes are in the same horizontal plane.

It is another object to provide a seat suspension system which locks the seat at a predetermined distance from the steering wheel and operator's pedals while still permitting the pivotal movements of the seat.

It is another object to provide a seat suspension system which utilizes both springs and shock absorbing dampers which are independently mounted to permit and restrict movement of the seat.

Yet another object of this invention is to provide a seat suspension system which may be easily adapted to existing vehicles.

These and other objects are obtained by the present invention wherein a base frame is mounted to the floor or chassis of the vehicle. The base frame can be directly mounted on a standard slide mechanism attached to the floor or chassis. This permits general location of the seat in the forward or backward directions to allow adjustment depending upon the size of the operator. There are locking mechanisms which hold the slide rails in a fixed location once the proper position is determined. A seat support frame which is mounted to the underside of the vehicle's seat has one end pivotally connected to the base frame. The pivotal connection allows the seat support frame to pivot with respect to two horizontal axes in response to irregularities in movement of the vehicle but prohibits movement of the seat in either the front or rearward directions in response thereto. As shown, there are a pair of springs mounted on either side of the seat between the base frame and seat support frame which limits the pivotal movement of the seat support frame. There are also a pair of shock absorbers with one being mounted adjacent each of the pairs of springs for absorbing and dissipating energy due to the vehicle seat movement.

In operation, the spring means and damper means on one side of the seat operate independently of the spring and damper mounted on the other side of the seat. The pivot connection at the front of the seat permits independent operation of each spring and damper mechanism independently of the other spring and damper mechanism.

The foregoing objects, features, and advantages will be apparent upon reading the brief description of the drawings and the description of the preferred embodiment.

DESCRIPTION OF THE PREFERRED EMBODIMENT

Figure 1:
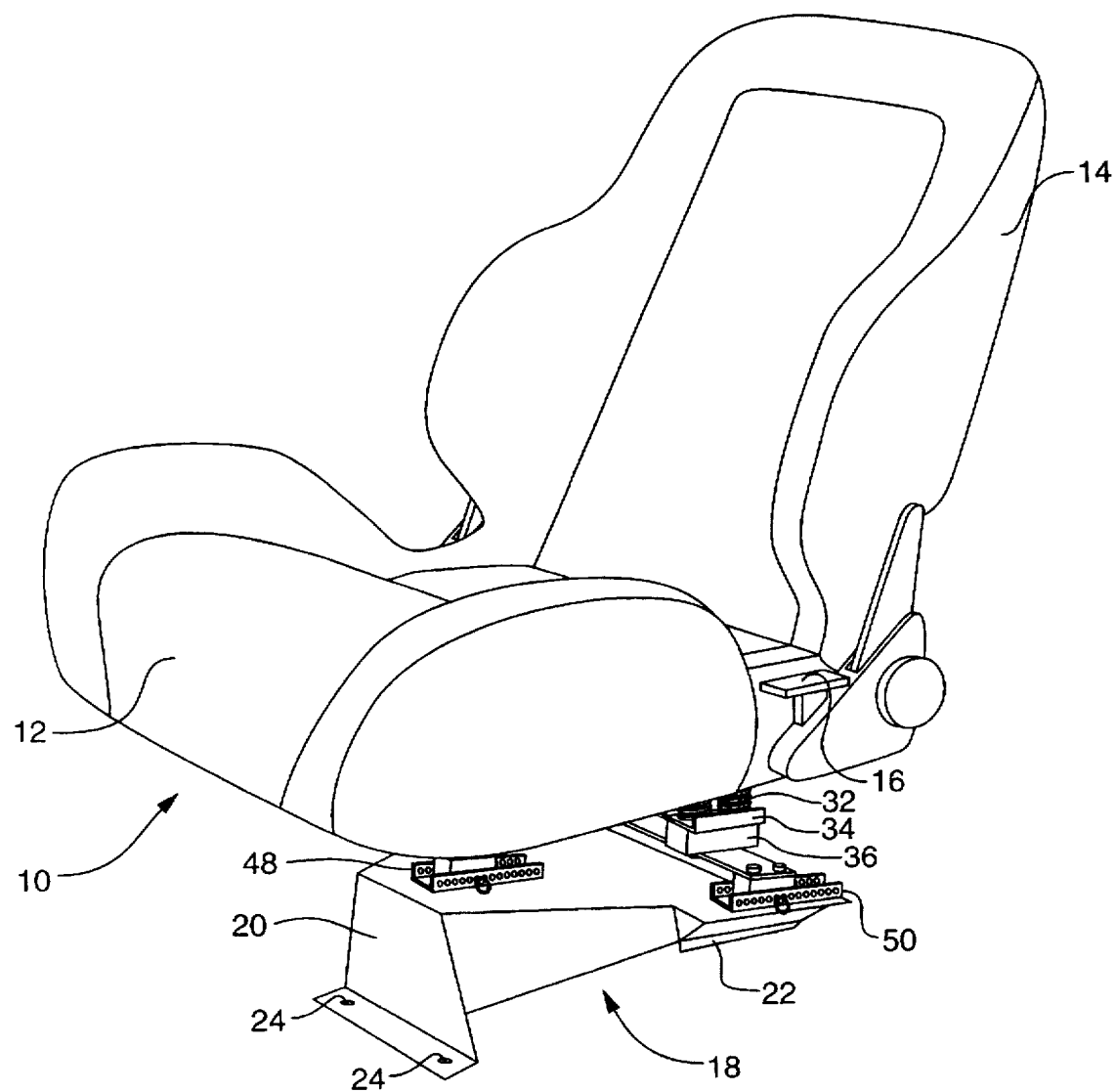
FIG. 1 is a perspective view of the inventive vehicle seat suspension device.

Turning first to FIG. 1, there is illustrated a perspective view of a vehicle seat suspension device. A conventional seat 10 which has a bottom cushion 12 and a seat back 14 is shown. The seat can be adjusted by means of a seat back adjustment lever 16 which controls the angle of the seat back 14 with respect to the bottom cushion around a horizontal axis extending across the width of the vehicle. Other adjustments of seat elements for comfort, as described above, could also be provided but are not shown. The seat 10 is mounted to a base frame 18 which has a front bracket 20 and a rear bracket 22. The base frame is adapted to be mounted on a slide plate (not illustrated) which in turn is mounted to a vehicle's floor. The slide plate may be of conventional design and will travel in a ball bearing carriage in a channel such that the distance of the seat 10 from the steering wheel and pedals can be adjusted and locked. Such adjustment mechanisms are widely available and commonly used in the automotive industry. The front bracket 20 and rear bracket 22 are provided with mounting holes 24 which permit easy mounting of the base frame 18 to the slide plate.

Figure 2:
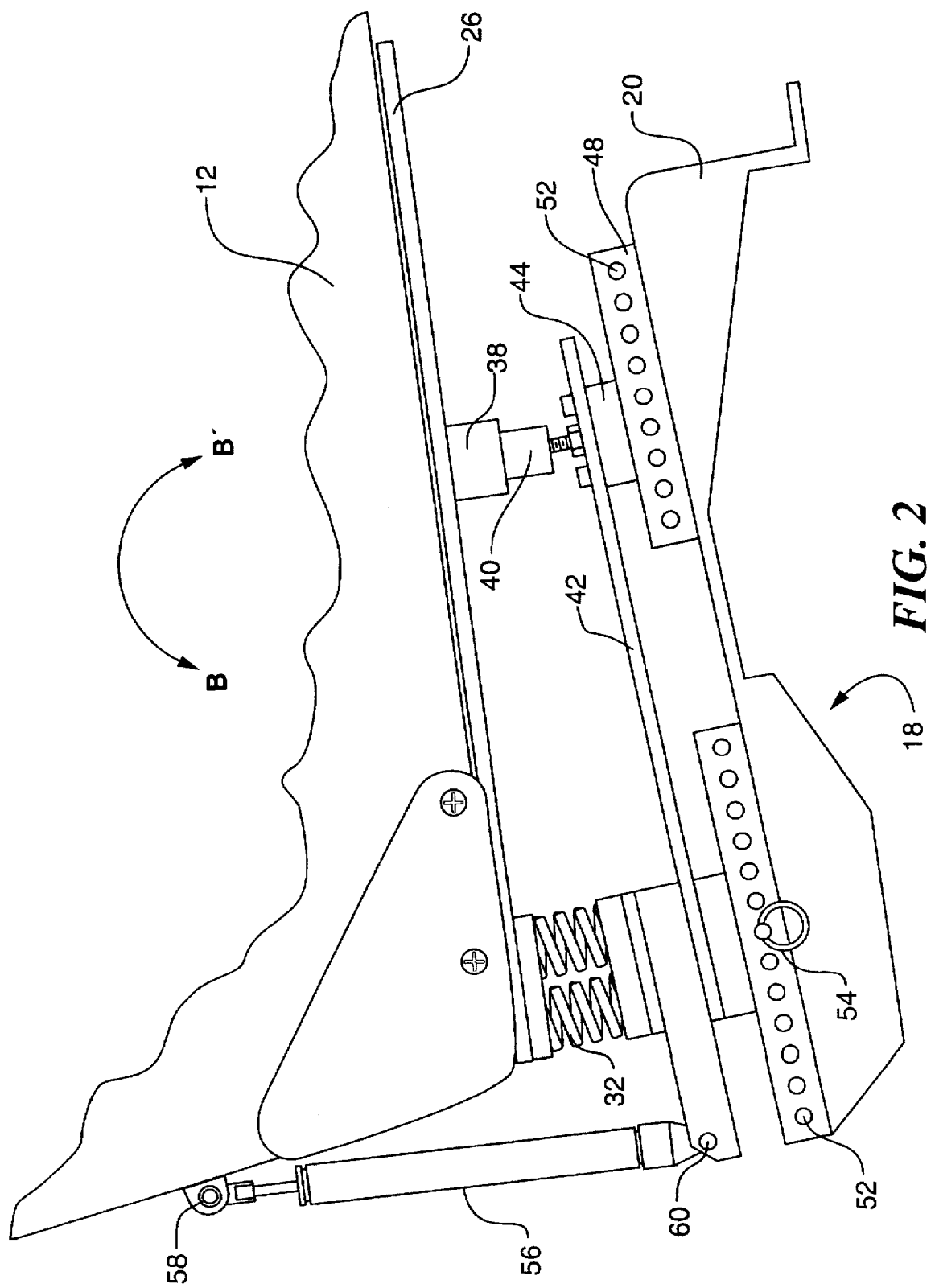
FIG. 2 a side elevational view with portions removed of the vehicle seat suspension device.

Looking at FIG. 2, we can see that the underside of the bottom cushion 12 is affixed to a seat support frame 26. At the rear of the seat support frame and on each side thereof are mounting brackets 28 which are each mounted on top of a pair of compression coil springs, a front spring 30 and a rear spring 32. A pair of these compression springs are located at each side of the seat support frame 26. The bottom of each pair 30, 32 of the compression springs is mounted in a flat plate 34 which in turn is mounted on a support plate 35. The support plates 35 in turn are mounted on two mounting blocks 36 on opposite sides of the seat. Mounting blocks 36 are linked by a bar or tension rod 37 extending across the width of the seat. The length of bar 37 is correlated with the width of the seat and would be different for different model seats. In some embodiments, each set of a flat plate 34, support plate 35 and mounting block would be formed in one piece. Although two springs 30 and 32 are shown and presently preferred, in some cases only one or more than two springs could be on each side of the rear portion of the seat. In another embodiment, not specifically illustrated, a leaf spring could be fixed at its center with its two ends engaging mounting brackets 28, thus providing the dynamic equivalent of the two independent spring sets on each side.

Forward of the compression springs 30, 32 and towards the front of the seat support frame 26 is a mounting block 38. This is affixed to the underside of the seat support frame 26. Extending downward from the mounting block 38 is a pivot connection which is preferably a ball joint pivot 40, the ball of which is engaged by a ball socket. The ball joint pivot 40 permits the seat support frame 26 to rotate about two horizontal axes. The first axis is a horizontal axis extending across the width of the vehicle and through the ball of the ball joint pivot 40. The second axis is along the longitudinal length of the vehicle and through the ball of the ball joint pivot 40. However, the ball joint pivot will not permit movement or rotation about a vertical axis extending from the floor of the vehicle vertically upwards through the ball of the ball joint pivot 40.

The mounting blocks 36 and 38 and ball joint pivot 40 are both mounted to a common mounting plate 42. This is accomplished by means of nut and bolt arrangements which may allow some adjustment as to the height of the blocks 36 and 38 with respect to the mounting plate 42. The plate 42 has downward projections 44, 46 which are received in front channel 48 and rear channels 50, respectively. The channels 48 and 50 have a plurality of holes 52 which will align with a hole (not illustrated) in the downward projections 44, 46. A locking pin 54 is inserted through the holes when they are aligned to position the seat 10 from front to rear on the base frame 18. This positioning is only meant to give a general location for the seat along the base frame 18 and not intended to give exact positioning of the seat with respect to the steering wheel or pedals. The exact positioning of the seat for the driver of the vehicle will be accomplished by means of the conventional slide plate.

The ball joint pivot 40 is connected to the front channel 48 through the downward projection 44 in a similar manner as the downward projections 46 are connected to the rear channels 50. Pin 54 will lock the downward projection 44 in place within the channel 48.

Figure 3:
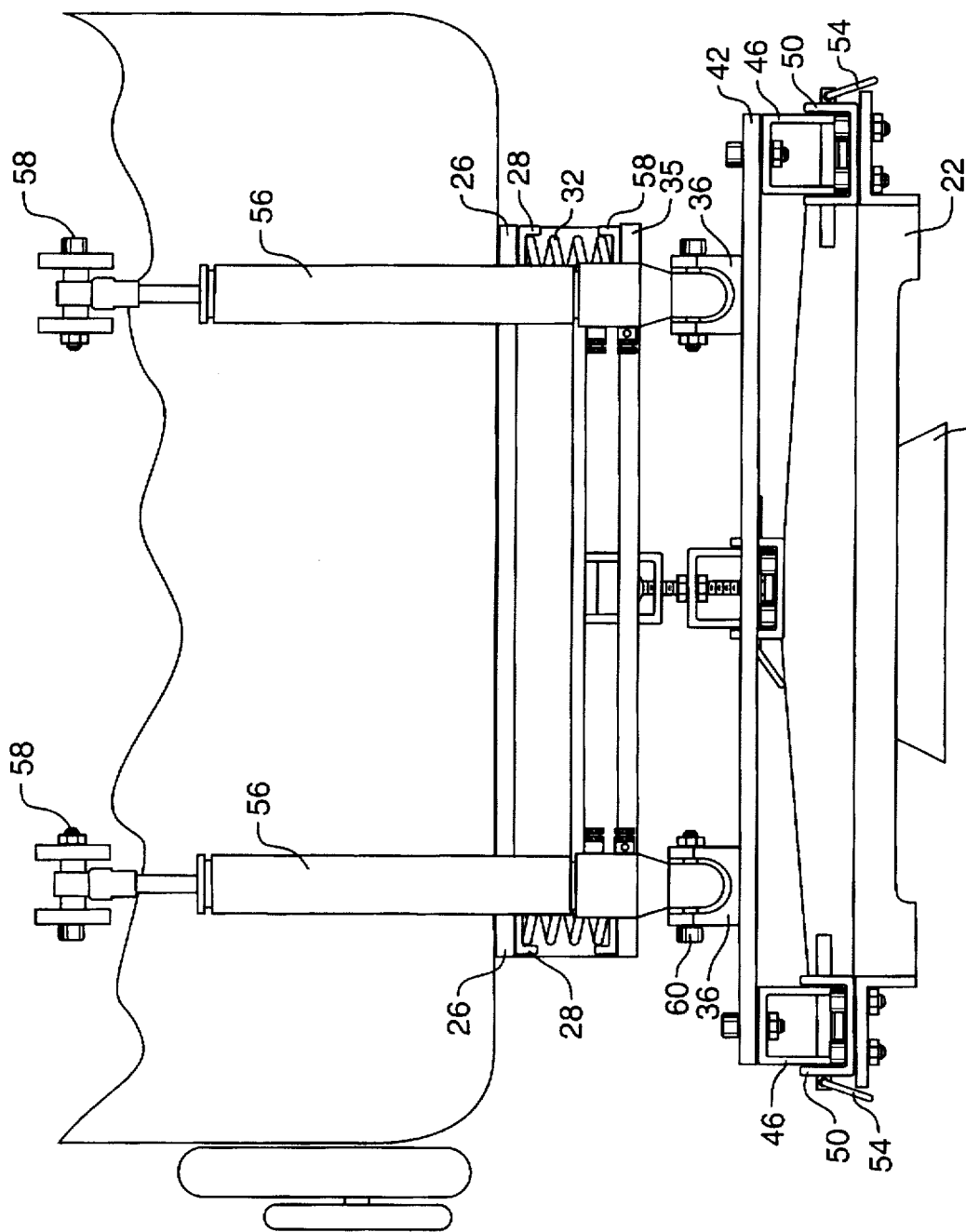
FIG. 3 is a rear view with portions removed of the vehicle seat suspension device.

Looking at FIGS. 2 and 3, there is also illustrated a pair of shock absorbers 56 mounted behind the seat back 14. The top of each shock absorber 56 is connected to the rear of the seat back 14 by means of a pin connecter 58 which is firmly affixed into the seat back 14. The bottom of each shock absorber 56 is connected by means of a bearing or ball joint 60 at the rear of the block 36 which permits limited rotation of shock absorbers 56 around bearing 60 and tilting of the seat toward or away from either side thereof. An elastomer could surround this bearing for greater resilience and flexibility. As the block 36 is mounted to the base frame 18, which is rigidly mounted to the vehicle's floor, the shock absorber 56 effectively has its bottom end secured to the vehicle floor.

It is believed that other locations of the shock absorbers 56 around the periphery of springs 30, 32 may be effective. For cosmetic reasons and to discourage tampering with the shock absorbers, it may be desirable to have the seat back structure extend rearward to include and cover the shock absorbers.

Although it would be desirable to make all components of the system and its attachment to the vehicle incapable of failure under all conditions, a head-on collision involving the vehicle could place enormous stresses on the attachment of the system to the vehicle, as it could with any such system. Therefore, it is proposed that both the front and rear of the system be linked to the vehicle chassis by webbing straps and attachments similar to those used for passenger seat belts, with or without impact responsive locking mechanisms, or even by strong metal cables.

Figure 4:
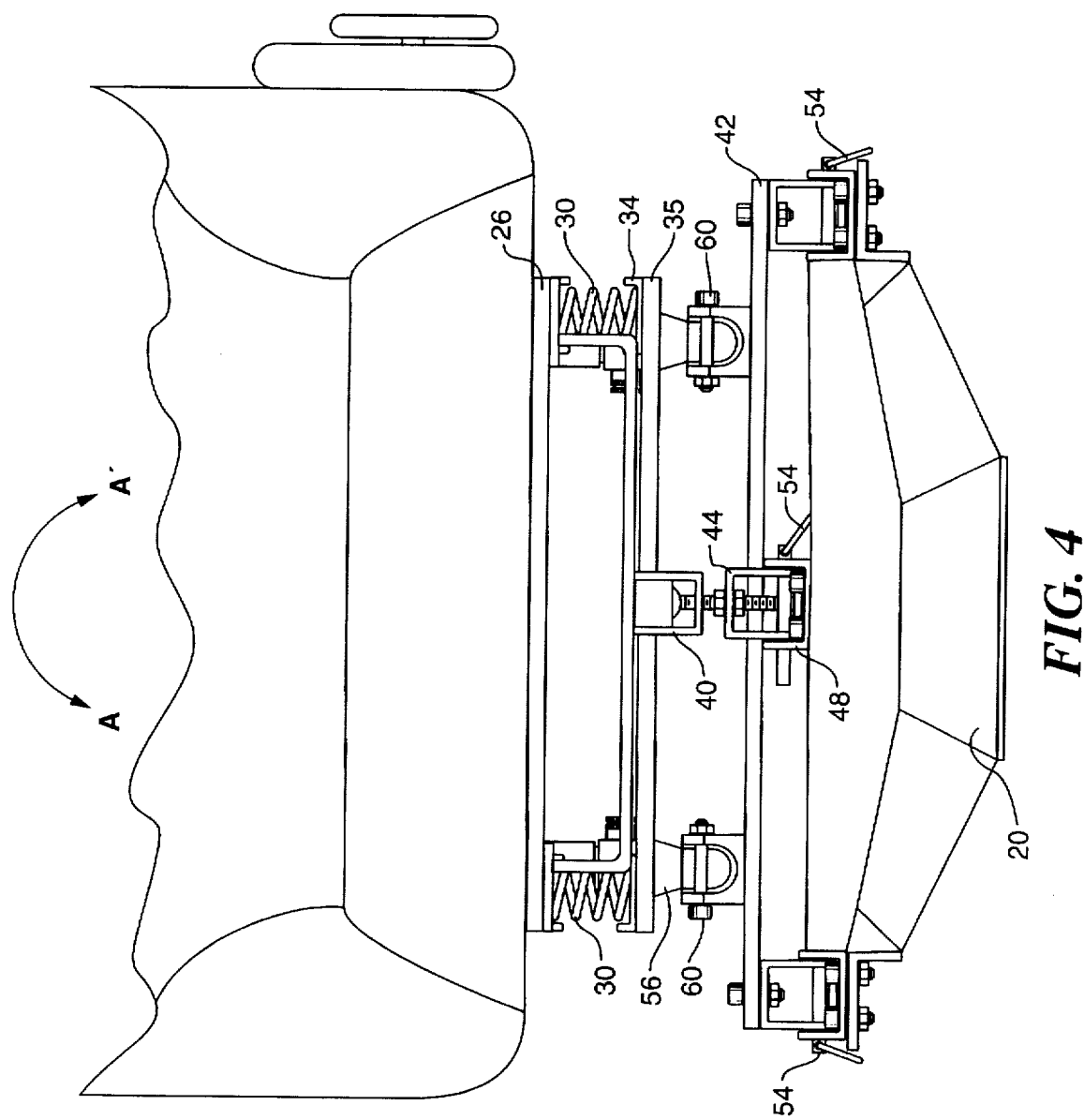
FIG. 4 s a front view with portions removed of the inventive device.

In operation, with the vehicle traveling over rough terrain, the springs 30, 32 compress or expand depending upon the vehicle's movement and the weight of the seat and its occupant. The shock absorbers 56 are independently linked to each pair of compression springs 30, 32. The shock absorbers are generally of fluid cylinder design, although gas cylinders could be used in some applications, and will act as damping means to dissipate the energy of the springs as they are compressed and expand. The amount of movement of the shock absorbers can be controlled by means of valve mechanisms within the shock absorbers as is known in the art. The seat 10 is free to rotate within the limits permitted by the springs 30, 32 and shock absorbers 56 such that the seat can rotate about the ball of ball joint pivot 40 in the direction of the arrows A–A' as seen in FIG. 4. An operator entering the vehicle can push down on the closest side of the seat to cause such rotation and make his entry easier. Alternatively, an additional mechanism can be added to force the seat to tilt in the direction of A' when the operator of the vehicle is not in the seat. This also makes it easier for the operator to enter the vehicle and sit on the seat.

In addition, the rear of seat 10 can move upward and downward. The amount of movement is controlled by the springs 30, 32 and shock absorbers 56. However, in no event is the seat permitted to move in a forward or backward direction due to the fact that the ball joint pivot 40 is firmly locked in position in a forward/backward direction.

Thus, there has been provided a vehicle seat suspension device that fully satisfies the objects, aims and advantages set forth herein. While the invention has been described in conjunction with a specific embodiment, it is evident that many alternatives, modifications and variations will be apparent to those skilled in the art in light of the foregoing description.

For example, the system is also adaptable for use in on the road vehicles to minimize seat motion in response to small bumps which are encountered in that environment; parts which are described herein as separate pieces could be combined or unitary pieces could be made of separate elements; and the form, number and exact locations of various parts could be varied. Accordingly, it is intended to embrace all such alternatives, modifications and variations as fall within the spirit and scope of the appended claims.

What is claimed:

1. A suspension system for a seat for a vehicle, said seat having a front portion and a rear portion comprising:

a base frame adapted to be rigidly attached to said vehicle;

a seat support frame adapted to be attached to said seat and having a front portion and a rear portion and a right side and a left side;

pivot means connected to said seat support frame for allowing said seat support frame to pivotally move with respect to said base frame, said pivot means comprising a ball and socket linkage between said base frame and said seat support frame;

spring means connected between said base frame and said seat support frame for limiting said pivotal movement of said seat support frame; and shock absorber means adapted to be connected between said base frame and said rear portion of said seat for dissipating energy absorbed by said spring means, whereby said pivotal movement of said seat support frame may be around two different axes of rotation.

2. The suspension system according to claim 1 wherein said ball and socket linkage is fixed in said base frame to prevent forward or rearward movement of said seat relative to said base frame.

3. The suspension system according to claim 2 wherein said ball and socket linkage is adjacent said front portion of said seat support frame.

4. The suspension system according to claim 1 wherein said spring means comprises at least two springs adjacent to said rear portion of said seat support frame, said two springs being respectively adjacent to said right side and said left side of said seat support frame, whereby said seat support frame is allowed to tilt sideways and to be forced back into a horizontal position by said springs.

5. The suspension system according to claim 4 wherein said shock absorber means comprises at least two shock absorbers, each of which is independently linked to one of said at least two springs.

6. The suspension system according to claim 5 wherein each of said shock absorbers is connected to said seat support frame respectively adjacent to said right side and said left side of said seat support frame.

7. The suspension system according to claim 6 wherein said shock absorbers are rearward of said springs.

8. A seat suspension device for a seat for a vehicle having a front, a rear and two sides comprising:

a base frame adapted for mounting on a floor of said vehicle, said base frame having a front portion and a rear portion;

a seat support frame adapted to be attached to said seat;

pivot connection means for pivotally connecting said seat support frame to said base frame while allowing said seat support frame to pivot with respect to said base frame, said pivot connection means comprising a ball and socket joint connected between said base frame and said seat support frame;

spring means for limiting pivotal movement of said seat support frame relative to said base frame; and shock absorber means for absorbing and dissipating energy absorbed by said spring means.

9. The seat suspension device according to claim 8 further comprising pivot fastening means connecting said pivot connection means to said base frame to prevent horizontal movement of said seat support frame with respect to said floor of said vehicle.

10. The seat suspension device according to claim 9 wherein said pivot fastening means is adjacent said front portion of said base frame and said spring means is adjacent said rear portion of said base frame.

11. The seat suspension device according to claim 10 wherein said spring means comprises at least two springs disposed at opposite sides of said base frame, permitting pivotal movement of said seat support frame about a longitudinal axis extending from said front of said vehicle to said rear of said vehicle and about a horizontal axis extending from side to side said vehicle.

12. The seat suspension device according to claim 10 wherein said spring means forces said seat support frame to assume a horizontal position.

13. The seat suspension device according to claim 10 wherein said shock absorber means comprises at least two shock absorbers adjacent to each of said springs.

14. The seat suspension device of claim 13 wherein each of said shock absorbers is attached to said base frame and adapted to be attached to said vehicle seat.

15. The seat suspension device of claim 8 including a slide carriage adapted to be disposed between said base frame and said floor of said vehicle to permit adjustable movement of said base frame forward and rearward along said floor of said vehicle.

* * * * *